Patented Aug. 10, 1948

2,446,856

UNITED STATES PATENT OFFICE 2,446,856

METHOD OF TREATING PHENOLS

Lee Irvin Smith, Minneapolis, Minn., assignor to Regents of the University of Minnesota, Minneapolis, Minn., a corporation of Minnesota No Drawing. Application October 16, 1943, Serial No. 506,551

10 Claims. (Cl. 260—396)

This invention relates to methods for preparing substituted paraquinone and hydroquinone compounds, and more particularly, to methods for preparing the polyalkyl substituted derivatives of such compounds, such as polymethylquinones and hydroquinones.

Paraquinone compounds of the aforementioned types, particularly the polyalkyl para hydroquinones, are of especial usefulness in the synthesis of products which exhibit the vitamin E effects of the natural tocopherols, but they have heretofore been obtainable only by laborious and relatively inefficient synthesis from rare and expensive materials such as pseudocumidine-5.

According to the present invention, it is possible to prepare the aforementioned paraquinone and hydroquinone materials with great facility from readily available and inexpensive materials such as phenolic compounds, and it is accordingly an object of the present invention to provide methods for such preparation.

Specifically, it is an object of the invention to provide methods of preparing polyalkyl substituted paraquinones and hydroquinones from substituted phenol compounds in which the para position is vacant and in which there are at least one substituent group as an allyl group or a plurality of substituent groups such as alkyl groups. In the preferred method of carrying out the present invention, a selected substituted phenolic compound is first reacted with an aromatic diazonium salt to form an azo dye compound which is then reduced by appropriate treatment to the corresponding amino phenol. The latter is then immediately reacted upon by an oxidizing agent without separation from the incidentally regenerated aromatic amines and the quinone product produced and separated. For oxidizing there may be used a metal salt of polyvalent metal where the metal is in a high state of oxidation. Typical useful oxidizing agents are ferric chloride, ferric sulfate, manganese dioxide, cerium sulfate, potassium or sodium dichromate or the like. The quinone product is then converted by reduction to the corresponding hydroquinone.

Sulfanilic acid is preferred for the initial reaction with the phenolic starting ingredient, although other aromatic diazonium compounds such as diazotized aniline may be used in specific procedures. For the reduction step stannous chloride is preferred, this reaction being carried out in the presence of an acid such as hydrochloric acid, and the reaction is carried on until the phenolic-aromatic azo-complex is reduced through the hydrazo stage until the amino phenol is liberated. The aromatic amino compound is regenerated at this stage, but according to the preferred procedure, is not removed, the entire reaction mass being at once treated with a large excess of any of the oxidizing agents hereinbefore mentioned, preferably ferric chloride, ferric sulfate, manganese dioxide or the like, the oxidizing agent being used in an amount sufficient to replace the stannous chloride and react with and oxidize off the amino phenol. The desired quinone thus produced in situ is removed by immediate steam distillation. The thus liberated quinone may be converted quantitatively to the corresponding hydroquinone by reaction with zinc and acetic acid or by catalytic reduction.

The reduction step may also be accomplished by using an alkali metal hydrosulfite such as sodium or potassium hydrosulfite or the like. The azo dye compound which results by coupling the selected phenol and the aromatic diazonium compound is warmed with the reducing agent, preferably sodium hydrosulfite until the red color disappears, at which time reduction is complete. The resultant amino compound which may easily be crystallized and separated if desired, is then oxidized, using any of the oxidizing agents heretofore mentioned, and the resultant quinone separated by steam distillation, as previously described.

The procedure of the present invention is shown in greater detail by the following examples, which are however, merely illustrative, and therefore must not be considered as limitations upon the invention.

Example I

A diazonium solution was first prepared by dissolving 105 grams of sulfanilic acid and 26.5 grams of sodium carbonate in 500 cc. of water. Solution of the ingredients was accomplished by warming, and after being completely dissolved, the solution was cooled to 5–15° C. A cold solution of 37 grams of sodium nitrite in 100 cc. of water was slowly added to the sulfanilic acid solution and the mixture slowly poured into a mixture of 600 grams of ice and 106 cc. of hydrochloric acid, and the whole was then permitted to stand for 20 to 30 minutes.

The diazonium solution thus prepared was then slowly poured into a well stirred solution of 63 grams (.5 mol) pseudocumenol-6 sometimes called 2,3,5-trimethyl phenol, and 75 grams of sodium hydroxide in 300 cc. of water.

Pseudocumenol-6 has the formula

When the substance is named as a derivative of the hydrocarbon, pseudocumene, the numbering starts at the position ortho to the hydroxyl group; however, when the substance is named as a derivative of phenol, the numbering starts with the position at which the hydroxyl group is substituted, and in that case, the formula is written and numbered as follows:

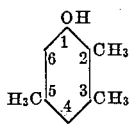

and is known as 2,3,5-trimethyl phenol. The excess of alkali is important at this stage of the reaction. The mass was then permitted to stand for at least two hours and preferably longer, allowing the ice (introduced by way of the diazonium solution) to melt and the temperature to rise to room temperature.

At this stage, the mass is a deep red color which denotes the existence of the azo dye compound.

The red dye reaction mass was made strongly acid by the addition of 200–250 cc. of (1 normal) hydrochloric acid and 164 grams of stannous chloride in 200 cc. of hydrochloric acid was then added. The mass was then heated almost to boiling until the solution cleared and the color became light orange brown.

Then, without separation of any of the ingredients, the mass was transferred to a steam distillation flask and a large excess (800 grams) of ferric chloride was added. The steam distillation was begun immediately, so as to prevent the formation of the undesired chloroquinone compounds.

The quinone and steam were distilled over and the quinone compound (an oily liquid) was separated from the mixed condensate by extraction with ethyl ether. The extraction was continued until the aqueous layer of the mixed condensate became colorless, as this quinone is fairly soluble in a large volume of water. The combined ether extractions were dried over sodium sulfate and the ether solvent removed by distilling it through a short packed column. The trimethyl quinone residue of 72 grams (95% yield) was solidified in an ice bath, and then melted at 26° C., and is suitable for most purposes. Where high purity is desired, the trimethyl quinone is distilled in vacuum, the boilng point being 98° C. under 10 mm. of mercury pressure, and 108° C. under 18 mm. of mercury pressure.

*Example II*

When a stoichiometric equivalent quantity of 3,5-dimethyl phenol is substituted for the pseudocumenol-6 of the preceding example, the remaining reactants and reagents being used in proportional quantities, a metaxyloquinone, having a melting point of 73–75° C. results, the yield being 74.5% based upon the amount of 3,5-dimethyl phenol used. The procedural details are as given for Example I.

*Example III*

When a stoichiometric equivalent quantity of 2,5-dimethyl phenol is used in place of the pseudocumenol-6 of Example I, the remaining reactants and reagents being used in proportional quantities, paraxylo-quinone, having a melting point of 123.5–125° C., results, the yield being 50% based upon the amount of 2,5-dimethyl phenol used. In this instance also, the procedural details are as given in Example I.

*Example IV*

When a stoichiometric equivalent quantity of 2,3,5,6-tetramethyl phenol (durenol) is used in place of the pseudocumenol-6 in Example I, the remaining reactants and reagents being used in proportional quantities, duroquinone having a melting point of 111–112° C. results, the yield being 60% based upon the amount of durenol used.

*Example V*

2,3,5-trimethyl-6-allyl phenol (1.73 grams) was dissolved in 7.9 cc. of 10% sodium hydroxide. To this was added 2.07 grams if diazotized sulfanilic acid prepared as in Example I, and the mixture, which thereupon became dark red, was allowed to stand at room temperature for approximately two hours. To the solution there was then added 4.53 grams of sodium hydrosulphite and the entire mixture was heated, with stirring until it reached 90° C. whereupon it became colorless. Upon cooling a light yellow, needle crystalline product separated and was recovered by filtration, 1.7 grams of the crystalline product being obtained. To the separated crystalline product thus obtained, there was added an oxidizing solution consisting of 5.5 grams of ferric chloride hexahydrate in 5 cc. of water and 2 cc. of concentrated hydrochloric acid. Steam was then passed through the mixture, whereupon the quinone compound, which was a liquid, was driven off and was recovered from the steam distillate by extraction with ethyl ether, 1.43 grams of 2,3,5-trimethyl-6-allyl quinone being obtained.

*Example VI*

Any of the quinone compounds produced in accordance with the foregoing examples may be converted into the corresponding hydroquinones by treatment with a mixture of zinc, glacial acetic acid and water. Thus the 1.43 grams of 2,3,5-trimethyl-6-allyl quinone produced in accordance with Example V was converted to 2,3,5-trimethyl-6-allyl hydroquinone by treatment with an excess of zinc in a mixture of 10 grams glacial acetic acid and 3 cc. of water. The mixture of the quinone, zinc, acetic acid and water was heated under reflux for 15 minutes and the hydroquinone compound recovered by pouring the refluxed mixture into ice and water, the hydroquinone compound separating in the form of white needle-like crystals. The yield of trimethyl allyl hydroquinone thus formed was 1.16 grams.

*Example VII*

In the procedure of Example I, diazotized aniline may be substituted for diazotized sulfanilic acid when suitable variations are provided in the procedure. Thus diazotized aniline was prepared by diazotizing 112 grams of aniline in 2400 cc. of sulphuric acid solution. The thus formed diazotized aniline was then reacted in alkaline solution with 126 grams pseudocumenol-6 (sometimes known as 2,3,5-trimethyl phenol) and the red dye compound thus formed was filtered off and dried, 218 grams being recovered (98% yield).

Twenty grams of the thus separated red dye compound was then reacted upon by 50 grams stannous chloride and subsequently treated with ferric chloride and hydrochloric acid as described in Example I yielded 2.5 grams of 2,3,5-trimethyl quinone, which was recovered by steam distillation followed by extraction with ethyl ether. The yield was 20.8% based upon the amount of pseudocumenol-6 used.

*Example VIII*

Ten grams of the dried red dye compound of Example VII was reduced catalytically by suspending the dye compound in ethyl alcohol along with 0.2 gram of Raney nickel as a catalyst. The mixture was subjected to 2000# initial pressure in a steel bomb at 120° C., the treatment being continued for 2 hours. At the end of the 2 hours treatment, the bomb was opened, the reaction mass, which smelled strongly of ammonia, was acidified with hydrochloric acid and treated with an excess of ferric chloride. The mass was then steam distilled, and the quinone compound removed from the condensate by extraction with ethyl ether. The yield was 13 grams of 2,3,5-trimethyl quinone (43%) having a boiling point of 98–103° C. under 11 mm. of mercury pressure.

*Example IX*

In a procedure similar to that of Example VIII, 20 grams of the dry red dye compound of Example VII was suspended in 150 cc. of water and treated with hydrogen at 2000# pressure in the presence of Raney nickel at 120° C. for 2 hours. The reaction mixture yielded 5 grams (41%) of 2,3,5-trimethyl quinone when thereafter treated as in Example VIII.

In the procedures of Examples VIII and IX, the catalytic reduction with hydrogen started at room temperatures when the high pressures (2000#) were used, but there was no reaction at low pressure (40#) even though the precedure was continued over long periods (15 hours).

One of the foremost advantages of certain of the procedures of the present invention is in the use of stannous chloride for reduction of the azo dye compounds, since separation of the reduced amino phenolic compounds is thereby rendered unnecessary, the entire reaction mass being treated with acidified ferric chloride all as set forth in Examples I through IV. High yields ranging from 50% in Example III to 95% in Example I are thereby made possible. The continuous procedure of Examples I through IV is not feasible where sodium hydrosulfite is used (Example V), or where the aromatic diazonium compound is derived from aniline, (Examples VII et seq.). In these, the azo dye compound is separated before reduction. The sodium hydrosulfite reduction is advantageous from the cost standpoint and is applicable to any of the aforesaid phenols.

The quinone compounds produced in accordance with the foregoing procedures may be reduced by many methods other than that set forth in Example VI. Thus they may be reduced catalytically by the use of hydrogen under pressure in presence of a catalyst such as Raney nickel, platinum oxide, palladium, or copper chromite, or they may be reduced by sulphur dioxide in the presence of water or by the use of various organic reducing agents.

This application is a continuation-in-part of my co-pending application Serial No. 284,459, filed July 14, 1939, now Patent No. 2,351,715 dated June 20, 1944.

Many obvious variations may be made in the foregoing procedures without departing from the spirit of the invention herein disclosed and claimed as follows.

What I claim is:

1. The process of preparing quinones which comprises reacting a substituted phenol of the benzene series in which the para position is vacant and which is a member of the group consisting of monoallyl phenols, polyalkyl substituted phenols and monoallylpolyalkyl substituted phenols with an aromatic diazonium compound, reducing the resultant admixture with an alkali metal hydrosulfite, separating the resultant compound and at an elevated temperature and under acid conditions oxidizing said compound with a salt of a polyvalent metal in which the metal is in a high state of oxidation and separating the resulting quinone compound.

2. The process of preparing quinones which comprises reacting a substituted phenol of the benzene series in which the para position is vacant and which is a member of the group consisting of monoallyl phenols, polyalkyl substituted phenols and monoallylpolyalkyl substituted phenols with an aromatic diazonium compound, reducing the resultant admixture with an alkali metal hydrosulfite, separating the resultant compound and treating it with an oxidizing agent comprising a salt of a polyvalent metal in which the metal is in a high state of oxidation under acidic conditions, and steam distilling the resultant mass to remove the quinone compound so formed.

3. The process of preparing quinones which comprises reacting a substituted phenol of the benzene series in which the para position is vacant and which is a member of the group consisting of monoallyl phenols, polyalkyl substituted phenols and monoallylpolyalkyl substituted phenols with an aromatic diazonium compound, reducing the resultant admixture with an alkali metal hydrosulfite, separating the resultant compound and treating it with ferric chloride under acid conditions and steam distilling the mass to remove the resultant quinone.

4. The process of preparing quinones which comprises reacting a substituted phenol of the benzene series in which the para position is vacant and which is a member of the group consisting of monoallyl phenols, polyalkyl substituted phenols and monoallylpolyalkyl substituted phenols with a diazotized sulfanilic acid, reducing the resultant admixture with an alkali metal hydrosulfite, separating the resultant compound and treating it with an oxidizing agent at an elevated temperature and under acidic conditions, said oxidizing agent comprising a salt of a polyvalent metal in which the metal is in a high state of oxidation, and separating the quinone compound thus produced.

5. The process of preparing quinones which comprises reacting a substituted phenol of the benzene series in which the para position is vacant and which is a member of the group consisting of monoallyl phenols, polyalkyl substituted phenols and monoallylpolyalkyl substituted phenols with a diazotized sulfanilic acid, reducing the resultant admixture with an alkali metal hydrosulfite, separating the resultant compound and treating it with an oxidizing agent comprising a salt of a polyvalent metal in which the metal is in a high state of oxidation under acidic conditions, and steam distilling the resultant mass to remove the quinone compound so formed.

6. The process which comprises reacting 2,3,5-trimethyl phenol and an aromatic diazonium compound, warming the mixture with an alkali hydrosulfite, separating the resultant amino compound and oxidizing it under acidic conditions with a salt of a polyvalent metal in which the metal is in a high state of oxidation and steam distilling to remove the resultant 2,3,5-trimethyl quinone.

7. The process which comprises reacting 2,3,5-trimethyl phenol with diazotized sulfanilic acid, reducing the resultant mixture with an alkali metal hydrosulfite, separating the resultant compound, and then oxidizing said compound with a salt of a polyvalent metal in which the metal is in a high state of oxidation at an elevated temperature and under acidic conditions to form the corresponding quinone.

8. The process which comprises reacting 2,3,5-trimethyl phenol with diazotized sulfanilic acid to form an azo dye compound, reducing said dye compound with sodium hydrosulfite, crystallizing and removing the resultant compound and then oxidizing it under acidic conditions with a salt of a polyvalent metal in which the metal is in a high state of oxidation, and steam distilling the mass to remove the resultant 2,3,5-trimethyl quinone.

9. The process which comprises reacting 2,3,5-trimethyl phenol with diazotized sulfanilic acid and reducing the resultant azo dye with sodium hydrosulfite, separating the reduced compound and under acidic conditions oxidizing it with a polyvalent metal salt wherein the metal ion is present at a higher valence, to form the corresponding 2,3,5-trimethyl quinone, and steam distilling the reaction mass to separate said quinone.

10. The process which comprises reacting 2,3,5-trimethyl phenol with diazotized sulfanilic acid and reducing the resultant azo dye with sodium hydrosulfite, separating the reduced compound and under acidic conditions oxidizing it with a substance selected from the group consisting of ferric chloride, ferric sulfate, manganese dioxide, potassium dichromate and cerium sulfate, to form the corresponding 2,3,5-trimethyl quinone, and steam distilling the reaction mass to separate said quinone.

LEE IRVIN SMITH.

REFERENCES CITED

The following references are of record in the file of this patent:

UNITED STATES PATENTS

| Number | Name | Date |
| --- | --- | --- |
| 2,351,715 | Smith | June 20, 1944 |

OTHER REFERENCES

Richter: "Organic Chemistry," vol. II (1912), pages 201, 202.